Patented June 17, 1941

2,245,886

UNITED STATES PATENT OFFICE 2,245,886

METHOD OF DRILLING WELLS USING MUD AND ACID

James W. Weir, Los Angeles, and Henry S. Montgomery, South Pasadena, Calif., assignors of thirty per cent to Harold C. Miller and ten per cent to Gerald B. Shea, both of Oakland, Calif., and twenty per cent to Alfred W. Knight, South Pasadena, Calif.

No Drawing. Application July 11, 1938,
Serial No. 218,626

3 Claims. (Cl. 255—1)

This invention relates to the drilling of wells, and particularly to a method in which a mud fluid is introduced in or circulated within a drill hole during or after a drilling operation to form a mud coating on the wall surfaces within the drill hole, and the mud coating so formed is subsequently removed by chemical treatment in order to permit the oil, gas or other fluid to flow into the well from a producing formation. The invention also includes a mud fluid of novel composition for use in such a method, as well as a mixture of divided solid materials for use in making such a mud fluid.

In the drilling of wells, and particularly in the drilling of oil wells, it is customary to introduce into the drill hole a suspension of finely divided mud-forming solids in water, in a manner and for purposes well known in the art. Such a suspension is commonly referred to as a mud fluid or drilling mud, and the solids therein usually consist principally of clay, although heavier solids such as hematite, barytes, or other "weighting" materials are sometimes added. The solids are at least in part of a colloidal nature, and some of the solids are deposited on the wall surfaces within the drill hole, forming "mud" coatings which tend to seal or plug the openings of the formation. Such mud coatings are often difficult to remove from the formation after the drilling operation is completed, and thus prevent or obstruct the desired flow of oil, gas or other fluid from the producing formation or formations into the hole.

The principal object of the invention is to provide an advantageous method whereby a mud coating formed on the wall surfaces of a drill hole by deposition from a mud fluid introduced into the hole may be removed therefrom so as to permit substantially unobstructed flow of fluid from a producing formation into the hole.

A particular object of the invention is to provide a method for this purpose, in which the mud fluid circulated or introduced in the drill hole is so treated, or is of such composition, that the mud coating formed in the drill hole may be disintegrated or removed by a simple chemical treatment involving the subsequent introduction of a suitable treating agent into the drill hole.

A further object of the invention is to provide a mud fluid of novel composition and containing a soluble reagent which will become thoroughly and intimately incorporated in the mud coating on the wall surfaces of a drill hole, and which will react with another reagent subsequently contacted therewith to cause disintegration or removal of the mud coating.

Another object of the invention is to provide a prepared mixture of mud-forming solids which may be used to form a mud fluid by mixing with water in suitable proportions, and which contains an added soluble reagent of the character above mentioned.

In accordance with our invention, the above objects are accomplished by forming a mud fluid comprising a suspenison of mud-forming solids in an aqueous solution containing a dissolved carbonate compound which will react with an acid to evolve carbon dioxide gas, introducing this mud fluid into a drill hole to cause deposition of the mud-forming solids and form on the walls of the drill hole a mud coating in which the dissolved carbonate compound is present in solution in the water retained in the mud coating, and subsequently introducing an acid into the drill hole to react with the carbonate compound and cause evolution of carbon dioxide gas within the mud coating. The acid permeates into the mud coating, either by diffusing into the water contained therein or by actual flow under hydrostatic pressure, and is thus brought into contact with the dissolved carbonate compound. The carbon dioxide produced by the resulting reaction between the acid and the dissolved carbonate compound serves to dislodge the deposited mud coating, leaving the formation unobstructed and permitting the fluid from the formation to enter the well. The material so dislodged may be removed from the hole by a swabbing or washing operation or, if the fluid entering the formation is a liquid as in the case of oil or water wells, the dislodged material may be removed in suspension in such liquid as it flows or is pumped from the well.

The carbonate compound dissolved in the aqueous liquid phase of the mud fluid may be any alkali metal carbonate, such as sodium carbonate or potassium carbonate, but we prefer to employ sodium carbonate because of its relatively low cost. The sodium carbonate or other soluble carbonate compound is added to the mud fluid, or to the materials used in making the mud fluid, either dry or in solution, in such proportion that the content of said carbonate compound in the mud coating formed in the drill hole will be sufficient to provide an effective disintegration or loosening of the mud coating by evolution of carbon dioxide gas upon contact with acid. For example, the proportion of alkali metal carbonate present in the mud fluid may be such that the aqueous solution in the mud fluid contains from about 1% to 5% of alkali metal carbonate, by weight.

A concentration as low as ¼% of alkali metal carbonate in the aqueous solution phase of the mud fluid is sufficient to cause fairly rapid disintegration, upon contact of acid with the mud coating formed by such mud fluid. The use of higher concentrations is advantageous, however, in practice, since it provides a more rapid and violent evolution of gas and produces more effective disintegration even though the mud coating has become packed quite hard against the formation or in fissures or other openings therein. Furthermore, the use of somewhat higher concentrations provides greater assurance that the water retained in the deposited mud coating will contain a sufficient proportion of alkali metal carbonate to provide effective disintegration. For these reasons, we prefer in general to use a mud fluid whose alkali metal carbonate content is at least ½%, and preferably about 1% or more by weight of the aqueous solution phase.

Concentrations of 1%, 2% or 5% of sodium carbonate, for example, may be employed with good results. Higher concentrations may be used, up to the limit of solubility of the carbonate in the aqueous phase of the mud fluid, although concentrations below 5% are generally adequate and are preferable from the standpoint of cost of reagent.

A composition of divided solid materials for use in making a mud fluid in accordance with this invention may be prepared by mixing divided solid mud-forming material with an alkali metal carbonate in any suitable manner, for example, by adding finely divided solid alkali metal carbonate to ground clay or other divided solid mud-forming material such as a mixture of clay and a suitable weighting material, and thoroughly intermixing the dry constituents. The proportion of carbonate added is such that, upon addition of sufficient water to provide a mud fluid of the desired specific gravity and consistency, the resulting mud fluid will contain the proper proportion of carbonate. For example, a dry mixture may be prepared by mixing 2 parts by weight of sodium carbonate with 98 parts by weight of clay or other mud-forming solids. If such a mixture is then used to make a mud fluid by the addition of 98 parts of water, the sodium carbonate will dissolve in the water to form a 2% solution and the resulting mud fluid will contain 100 parts of this solution to 98 parts of suspended solids. If the proportion of water is increased, for example, to 198 parts, the mud fluid will contain 200 parts of a 1% solution of sodium carbonate to 98 parts of suspended solids.

The proportion of alkali metal carbonate in the prepared mixture of solid materials is variable between rather wide limits, depending upon the nature of the mud-forming solids, the specific gravity and consistency of mud fluid desired, and the concentration of carbonate which it is desired to provide in the mud fluid. Thus, the proportion of carbonate to mud-forming solids may vary from about ½% or less to about 20% or more, by weight.

A mud fluid containing the desired proportion of dissolved alkali metal carbonate may be prepared in various ways. For example, the carbonate may be first added to the dry clay or other mud-forming solids or portions of same, and the resulting mixture or mixtures then combined with a suitable proportion of water, as described above. Alternatively, the alkali metal carbonate, clay or other mud-forming solids, and water may be mixed together, the proportions again being such as to form a fluid suspension containing sufficient mud-forming solids to provide the desired specific gravity and consistency and also containing the desired proportion of carbonate in solution in the water present.

As another example, the clay or other mud-forming solids may be first mixed with water to form a mud fluid in the usual manner, and the desired proportion of alkali metal carbonate then added to this fluid suspension. According to this method of preparation, the carbonate may be introduced in dry, powdered condition and dissolved in the water present in the mud fluid, or it may be introduced as an aqueous solution of any desired concentration, prepared by previously dissolving the carbonate in water.

A highly colloidal material such as bentonite and "Aquagel" is frequently added to muds to improve the colloidal and lubricating properties thereof, although the use of such agents has been considered objectionable by many drillers owing to the tendency of the resulting mud to form a mud coating which is very difficultly removed. The employment of the present invention is particularly advantageous where muds of this type are used in drilling, as the resulting mud sheath may be readily removed by the acid treatment, thus overcoming the principal defect of such muds. The present invention, therefore, contemplates the use of such highly colloidal muds, and it will be appreciated that the carbonate material may be added to the colloidal material before incorporation of the latter in the mud fluid, or may be added to the complete mud, as desired.

A prepared mud fluid made by any of the above methods may be circulated through the drill hole throughout the drilling of a well, in the same manner as the conventional form of drilling mud ordinarily used. However, for reasons of economy, it generally will be preferable to use a mud fluid of normal composition during the drilling of a well down to or adjacent a known or probable producing formation, and to use the prepared mud fluid of this invention while drilling through such formation or while drilling through a plurality of such formations. If a well is being drilled with the use of a mud fluid of ordinary composition, and it is desired to start using a mud fluid containing dissolved alkali metal carbonate, the ordinary fluid may be removed from the entire system including the drill hole and the pit, tanks, or other means usually provided at the surface for storage of fluid and settling of the cuttings carried out of the hole therewith, and a sufficient quantity of prepared mud fluid containing the carbonate may then be introduced into the system and the drilling operation resumed.

A simpler method of making the change, however, is to add the desired proportion of sodium carbonate to the ordinary mud fluid, preferably while continuing the circulation thereof through the drill hole in order to thoroughly distribute the added carbonate throughout the entire quantity of mud fluid in the system. The carbonate may be added, either in dry form or as an aqueous solution, to the mud fluid passing from the top of the hole into the mud pit or other surface storage and settling means. It may be added in a quantity calculated to be sufficient to provide the desired concentration thereof in the water present in the entire quantity of mud fluid in the system, or it may be added until a certain concentration of the carbonate is reached as shown by an actual test on a portion of the circulated fluid. This addition of the carbonate to the mud fluid may, if desired, be effected without interrupting the drilling operation.

In any event, a prepared mud fluid containing the desired proportion of dissolved alkali metal carbonate is circulated through the drill hole during the drilling of at least that portion of the total depth of the hole from which it is desired to subsequently remove the deposited mud coating in order to obtain production of oil, gas, or other fluid. When such a mud fluid is used, the mud coating deposited in the hole contains not only solid constituents of the mud but also a corresponding proportion of the added alkali metal carbonate which remains dissolved in the water retained in the mud coating and is thus held in thoroughly dispersed condition within the mud coating.

Thus, at the completion of the drilling operation, the mud coating remaining on the walls of the hole, at least within the producing formation or formations, is thoroughly impregnated with the alkali metal carbonate. A suitable acid may subsequently be introduced into the hole and into contact with the mud coating, in sufficient quantity to react with the alkali metal carbonate present in the mud fluid. The reaction of the acid with the carbonate causes evolution of carbon dioxide gas, and since this reaction takes place at least partly within the deposited mud coating the gas evolution serves to effectively dislodge the solid clay or other materials present therein so that the dislodged solids may be readily removed from the hole.

The acid used may be any acid which will react with the alkali metal carbonate to evolve carbon dioxide. For example, we may use sulphuric acid or hydrochloric acid, either concentrated or dilute. Sulphuric acid of fairly high strength, such as 80% or more $H_2SO_4$, or even fuming acid may be advantageously employed, and preferably commercial concentrated sulphuric acid, in order to provide rapid reaction on the carbonate and also to avoid or minimize attack, by the acid, of the casing or other metal parts with which it comes in contact.

The acid may be introduced into the drill hole in any desired manner, as by forcing the same into the hole through the drill pipe. If desired, the undeposited mud fluid remaining in the hole when the drilling is completed may be removed before introducing the acid by any of the well known methods. This may be done by bailing, swabbing, or by displacing it with water, oil or other substance introduced into the well. The acid may be allowed to remain in the hole for such length of time as may be found necessary to effect the desired chemical reaction and disintegration or dislodgment of the mud coating, a period of from about an hour to about twelve hours being usually sufficient.

When the disintegration of the mud coating is completed, the well may be washed, bailed, pumped, or otherwise treated to remove the dislodged mud solids, reagents, and reaction products therefrom, and is then ready to be placed on production, the removal of the mud coating from the walls of the hole serving to permit substantially unobstructed flow of liquid and/or gas into the hole from the producing formation or formations.

We claim:

1. The method which comprises: introducing into a drill hole during the drilling thereof a mud fluid comprising a mixture of water and mud-forming solids consisting at least partly of clay, said mud fluid also containing an alkali metal carbonate dissolved in the water; forming a mud coating within said drill hole containing deposited solids from said mud fluid and also containing said alkali metal carbonate; subsequently introducing into the drill hole, and into contact with said mud coating, an acid which will react with said carbonate to evolve carbon dioxide gas, to cause dislodgement of solids from said coating due to evolution of carbon dioxide gas by reaction of said acid with the alkali metal carbonate in said mud coating; and removing from the drill hole solids so dislodged.

2. The method which comprises: introducing into a drill hole during the drilling thereof a mud fluid comprising mud-forming solids consisting at least partly of clay, suspended in an aqueous solution containing from about 1% to about 5% of an alkali metal carbonate by weight of said solution; forming a mud coating within said drill hole containing deposited solids from said mud fluid and also containing said alkali metal carbonate; subsequently introducing into the drill hole, and into contact with said mud coating, an acid which will react with said carbonate to evolve carbon dioxide gas, to cause dislodgement of solids from said coating due to evolution of carbon dioxide gas by reaction of said acid with the alkali metal carbonate in said mud coating, and removing from the drill hole solids so dislodged.

3. The method which comprises: introducing into a drill hole during the drilling thereof a mud fluid comprising a mixture of water and mud-forming solids consisting at least partly of clay, said mud fluid also containing an alkali metal carbonate dissolved in the water; forming a mud coating within said drill hole containing deposited solids from said mud fluid and also containing said alkali metal carbonate; subsequently introducing sulphuric acid into the drill hole, and into contact with said mud coating, to cause dislodgment of solids from said coating due to evolution of carbon dioxide gas by reaction of said sulphuric acid with the alkali metal carbonate in said mud coating; and removing from the drill hole solids so dislodged.

JAMES W. WEIR.
HENRY S. MONTGOMERY.